US012612815B2

(12) United States Patent
Youtsey

(10) Patent No.: US 12,612,815 B2
(45) Date of Patent: Apr. 28, 2026

(54) CABLE TENSION DEVICE FOR OVERHEAD DOOR

(71) Applicant: Clopay Corporation, Mason, OH (US)

(72) Inventor: Thomas Edward Youtsey, Wilder, KY (US)

(73) Assignee: Clopay Corporation, Mason, OH (US)

( * ) Notice: Subject to any disclaimer, the term of this patent is extended or adjusted under 35 U.S.C. 154(b) by 544 days.

(21) Appl. No.: 17/579,997

(22) Filed: Jan. 20, 2022

(65) Prior Publication Data

US 2023/0228138 A1 Jul. 20, 2023

(51) Int. Cl.

| | |
|---|---|
| ***E05D 15/24*** | (2006.01) |
| ***E05D 13/00*** | (2006.01) |
| ***E05D 15/16*** | (2006.01) |

(52) U.S. Cl.
CPC ......... *E05D 15/24* (2013.01); *E05D 13/1215* (2013.01); *E05D 15/165* (2013.01); *E05Y 2201/67* (2013.01); *E05Y 2900/106* (2013.01)

(58) Field of Classification Search
CPC ................. E06B 9/58; E06B 2009/583; E06B 2009/587; E05D 15/24; E05D 15/22; E05D 2015/225; E05D 13/12; E05D 13/1207; E05D 13/1215; E05D 13/1223
USPC ............................................... 160/242, 418.1
See application file for complete search history.

(56) References Cited

U.S. PATENT DOCUMENTS

| | | | | |
|---|---|---|---|---|
| 3,412,780 A | 11/1968 | Moler | | |
| 4,494,256 A * | 1/1985 | Radtke | E04H 4/101 | 160/265 |
| 2002/0003031 A1* | 1/2002 | Hoofard | E05D 15/24 | 160/201 |
| 2002/0184824 A1* | 12/2002 | McCartney | E05D 13/00 | 49/322 |
| 2003/0041980 A1* | 3/2003 | Schulte | E05D 13/1215 | 160/193 |
| 2003/0213566 A1* | 11/2003 | Lewis, Jr. | E05D 15/246 | 160/201 |
| 2008/0245484 A1 | 10/2008 | Tillman | | |
| 2009/0249696 A1* | 10/2009 | Metz | E05F 15/686 | 49/199 |
| 2021/0115717 A1 | 4/2021 | Shives | | |

FOREIGN PATENT DOCUMENTS

EP 2333230 A1 6/2011

OTHER PUBLICATIONS

International Search Report and Written Opinion, PCT/US23/60724, Jul. 10, 2023, 12 pages.

* cited by examiner

*Primary Examiner* — Abe Massad
*Assistant Examiner* — Matthew R. Shepherd

(57) ABSTRACT

An example cable tension device is provided. The cable tension device includes a bracket, an arm, and a spring. The arm is rotatably coupled to the bracket and comprises a roller bar to receive a cable of an overhead door. The spring is coupled to the arm. The spring is under a load to cause the arm to rotate away from the bracket to maintain a tension on the cable.

3 Claims, 9 Drawing Sheets

CABLE TENSION DEVICE FOR OVERHEAD DOOR

BACKGROUND

Overhead doors to cover external and internal openings may comprise panel sections that are connected by hinges. An overhead door can be raised into an open position and lowered to a closed position through rollers in a track system. The track system has a vertical section mounted to a wall, and a horizontal section mounted to a ceiling or overhead structure. In addition to the track system, a cable system interacts with a counterbalance system comprising a torsion spring bar. The torsion spring bar comprises a torsion spring and cable drums located on each end of the torsion spring bar. The cable drum is connected to a first end of a cable, and the second end of the cable is attached to a bottom bracket, which is mounted to the bottom-most panel of the door.

DETAILED DESCRIPTION

Examples described herein provide examples of a cable tension device for an overhead door. As discussed above, an overhead door can include a cable system to help open and close the panels of the overhead door. One issue with cable systems for overhead doors is that the tension of the cable should be consistent so as not to misalign the cable on the cable drum. As there are two cable drums, it is also an issue if the first cable has a different tension than the second cable. Two different tension levels in the cables may result in the overhead door not moving in a leveled fashion and becoming stuck within the track, cables coming off of the drums, or damage to the door.

In some instances cable tension may change due to a variety of different causes. For example, the cable tension may change due to cable stretching over time, unequal cable lengths, door panels accelerating and/or decelerating in the track when transitioning from a horizontal position to a vertical position and vice versa, or the door abruptly stopping during motion.

Maintaining constant tension on a cable is difficult. Unequal tension may cause cable slack, leading to misalignment of the door sections within the track system (causing the sections to jamb or wedge within the track system). Further, the cable's unequal tension may lead to the cable unwinding from the cable drum.

It is known to use devices to maintain tension in cables. Such devices are either mounted on the door or integrated with motor/operator in some manner. The location of devices for maintaining tension in cables poses a challenge for overhead doors. It is not always possible to mount devices in specific locations. The distance between the cable and the building wall is fixed due to the counterbalance system location and has limited space for a functional device.

The present disclosure addresses the issues identified above with a tension system utilizing springs oriented to be used in a limited volume of space without disrupting the other necessary hardware on the overhead door. The cable tension device of the present disclosure can be mounted in a left-hand or right-hand orientation with respect to the door and can be located on the wall, the jamb, or on the track system. The cable tension device of the present disclosure can work effectively in a horizontal orientation, as well as in a left-hand or right-hand orientation within the limited distance between the wall to the side of the opening and the cable.

Figure 1:
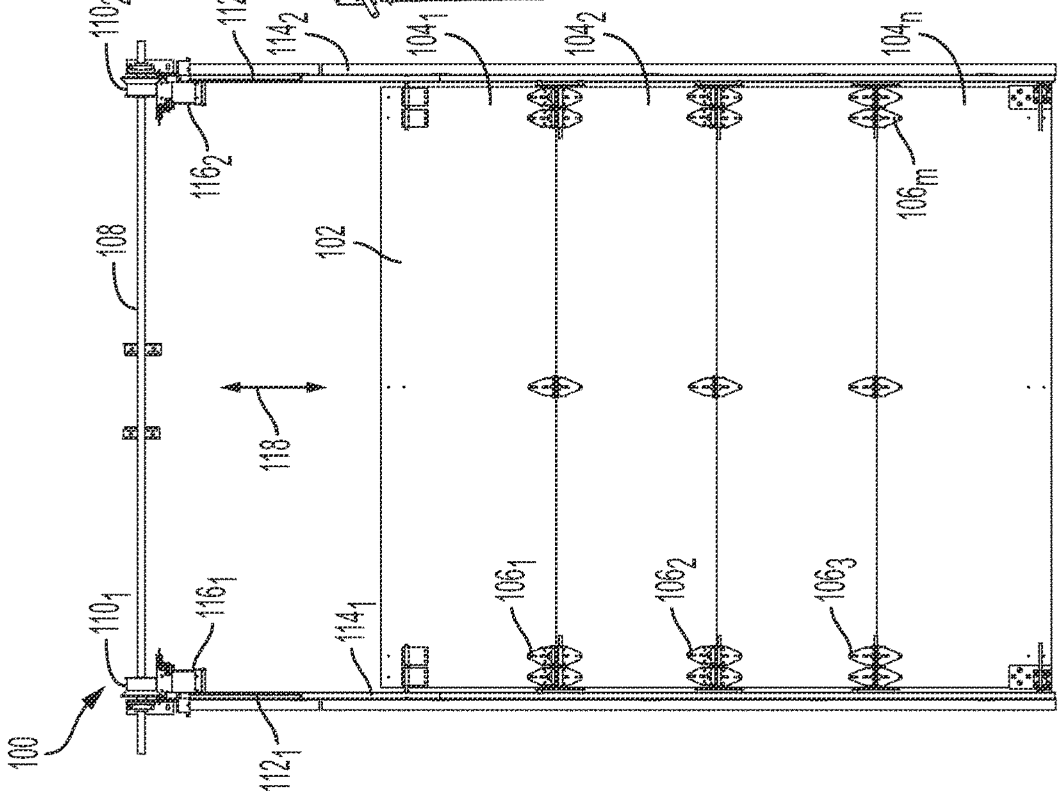
FIG. 1 is an interior front view of an overhead door with a cable tension device of the present disclosure.

FIG. 1 illustrates an interior front view of an overhead door system 100 with a cable tension device 116 of the present disclosure. FIG. 1 illustrates a view of the overhead door system 100 with a door 102 in the closed positioned.

In one embodiment, the overhead door system 100 includes the door 102. The door 102 may be comprised of a plurality of panels $\mathbf{104}_1$ to $\mathbf{104}_n$ (hereinafter also referred to individually as a panel 104 or collectively as panels 104). The panels 104 may be vertically arranged and movably coupled via panel fasteners or hinges $\mathbf{106}_1$ to $\mathbf{106}_m$ (hereinafter also referred to individually as a hinge 106 or collectively as hinges 106). The hinges 106 may include mechanical couplings to attach the panels 104 to one another.

The panels 104 may be constructed of the same materials or different materials. In one embodiment, each panel 104 may be a metal frame structure without a middle panel (e.g., an open panel). The metal frame structure may comprise at least two vertical stiles and at least two horizontal stiles connected at right angles. The metal frame may further comprise a third vertical stile, a fourth vertical stile, a fifth vertical stile, and a sixth vertical stile forming multiple middle areas defined by the metal frame structure. The middle areas of this metal frame can be open, may comprise a solid metal panel, may comprise an open metal structure (e.g., screen, grid, grate, woven metal structure, or the like), may comprise a polyacrylate panel that is clear or translucent, may comprise polymethylmethacrylate (PMMA) that is clear or translucent, may comprise a polypropylene panel that is clear or translucent, may comprise a glass panel that is clear or translucent, or may comprise a laminate structure that is intended to have impact resistance.

In one embodiment, the overhead door system 100 may include a first track $\mathbf{114}_1$ and a second track $\mathbf{114}_2$. The door 102 may be guided into an open and closed position via the first track $\mathbf{114}_1$ and the second track $\mathbf{114}_2$. For example, wheels or other mechanical means (not shown) may be fitted inside of the first track $\mathbf{114}_1$ and the second track $\mathbf{114}_2$. As the door 102 is opened and closed, the wheels may travel along the first track $\mathbf{114}_1$ and the second track $\mathbf{114}_2$.

In one embodiment, the overhead door system 100 may include a shaft 108 that is located over the door 102. A first cable drum $\mathbf{110}_1$ and a second cable drum $\mathbf{110}_2$ may be coupled to opposite ends of the shaft 108. A first cable $\mathbf{112}_1$ may be coupled to the first cable drum $\mathbf{110}_1$ and to the last panel $\mathbf{104}_n$. A second cable $\mathbf{112}_2$ may be coupled to the second cable drum $\mathbf{110}_2$ and the last panel $\mathbf{104}_n$.

The first cable $\mathbf{112}_1$ and the second cable $\mathbf{112}_2$ may assist in opening and closing the door 102. For example, a motor or operator (not shown) may drive the shaft 108 and/or the cable drums $\mathbf{110}_1$ and $\mathbf{110}_2$. To open the door 102, the cable drums $\mathbf{110}_1$ and $\mathbf{110}_2$ may be rotated to move the first cable $\mathbf{112}_1$ and the second cable $\mathbf{112}_2$ in a vertically upwards direction. To close the door 102, the cable drums $\mathbf{110}_1$ and $\mathbf{110}_2$ may be rotated to allow the first cable $\mathbf{112}_1$ and the second cable $\mathbf{112}_2$ to move in a vertically downward direction. As a result, the door 102 may be moved up and down in a direction shown by an arrow 118.

As noted above, maintaining tension in the first cable $\mathbf{112}_1$ and the second cable $\mathbf{112}_2$ helps to ensure that the door 102 can be opened and closed efficiently and safely. Loss of tension can cause the door 102 to jam, cause loud operation due to clanging between the panels 104, or create a hazardous situation where the door may suddenly close on a person or object. In addition, maintaining an equal amount of tension in the first cable $\mathbf{112}_1$ and the second cable $\mathbf{112}_2$ also helps to ensure correct operation of the door 102. For example, maintaining an equal amount of tension in the first cable $\mathbf{112}_1$ and the second cable $\mathbf{112}_2$ may ensure that the sides of the door 102 are even with each other when the door 102 is opened and closed.

The cable tension devices $\mathbf{116}_1$ and $\mathbf{116}_2$ of the present disclosure can be deployed for both the first cable $\mathbf{112}_1$ and the second cable $\mathbf{112}_2$ to maintain the tension in the first cable $\mathbf{112}_1$ and the second cable $\mathbf{112}_2$. The cable tension devices $\mathbf{116}_1$ and $\mathbf{116}_2$ may also help to ensure that the same amount of tension is maintained in the first cable $\mathbf{112}_1$ and the second cable $\mathbf{112}_2$. In one embodiment, the cable tension devices $\mathbf{116}_1$ and $\mathbf{116}_2$ may be located directly under the first cable drum $\mathbf{110}_1$ and the second cable drum $\mathbf{110}_2$, respectively.

As will be described in further details below, the cable tension devices $\mathbf{116}_1$ and $\mathbf{116}_2$ are designed to be compact, with a limited number of components to improve installation ease. The limited number of components can ensure that the cable tension devices $\mathbf{116}_1$ and $\mathbf{116}_2$ are properly and consistently installed and reduce the risk of malfunction.

The compact design ensures that the cable tension devices $\mathbf{116}_1$ and $\mathbf{116}_2$ can fit in various locations without disruption to operation of the door 102. The cable tension devices $\mathbf{116}_1$ and $\mathbf{116}_2$ may be mounted onto a wall, a door jamb, onto the tracks $\mathbf{114}_1$ and $\mathbf{114}_2$ (e.g., via a track bracket), and the like, to be close to the first cable drum $\mathbf{110}_1$ and first cable $\mathbf{112}_1$ and the second cable drum $\mathbf{110}_2$ and the second cable $\mathbf{112}_2$.

Moreover, the cable tension devices $\mathbf{116}_1$ and $\mathbf{116}_2$ may be deployed on either side (e.g., right and left side) of the door 102 using a single design. For example, the cable tension devices $\mathbf{116}_1$ and $\mathbf{116}_2$ may be mirror images of one another to allow a single design to be used for both sides of the door 102. Thus, manufacturing may be more efficient and inventory may be minimized.

Figure 2:
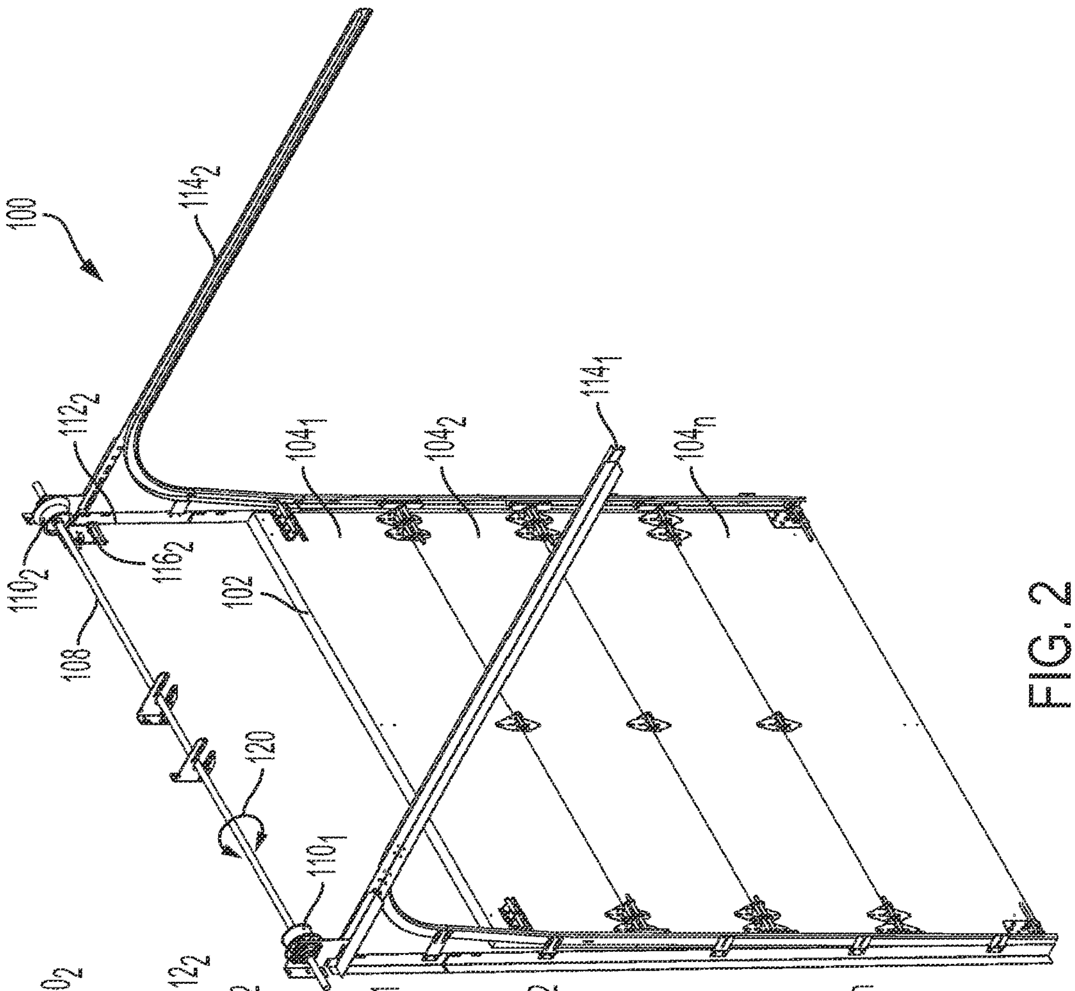
FIG. 2 is an interior perspective view of an overhead door with the cable tension device of the present disclosure.

FIG. 2 illustrates an interior isometric view of the overhead door system 100. FIG. 2 illustrates how the shaft 108 can be rotated around an axis as shown by an arrow 120. As the shaft 108 is rotated, the cables $\mathbf{112}_1$ and $\mathbf{112}_2$ may be pulled around the respective cable drums $\mathbf{110}_1$ and $\mathbf{110}_2$ to pull the door 102 up along the tracks $\mathbf{114}_1$ and $\mathbf{114}_2$. FIG. 2 illustrates how the tracks $\mathbf{114}_1$ and $\mathbf{114}_2$ curve into a horizontal direction where the door 102 may be located in an open position.

FIG. 2 also illustrates how the cable $\mathbf{112}_2$ may rest against a portion of the cable tension device $\mathbf{116}_2$. As described in further details below, the cable tension devices $\mathbf{116}_1$ and $\mathbf{116}_2$ may be spring loaded to cause an arm to press away from the door 102 to maintain tension on the cables 112*i* and $\mathbf{112}_2$.

In one embodiment, the cable tension device $\mathbf{116}_2$ (and similarly $\mathbf{116}_1$) may include a bracket, an arm rotatably coupled to the bracket, and a spring coupled to the arm. The bracket may be used to mount the cable tension device $\mathbf{116}_2$. The arm may include a roller bar to receive the cable $\mathbf{112}_2$. The spring may be placed under a load to cause the arm to rotate away from the bracket to maintain a tension on the cable $\mathbf{112}_2$.

The cable tension devices $\mathbf{116}_1$ and $\mathbf{116}_2$ may have different embodiments with respect to a type of spring that is used and how the spring is arranged relative to the arm. One embodiment may include a torsion spring, as illustrated by example in FIGS. 3-7. Another embodiment may include a compression spring, as illustrated by example in FIGS. 8-12.

Figure 3:
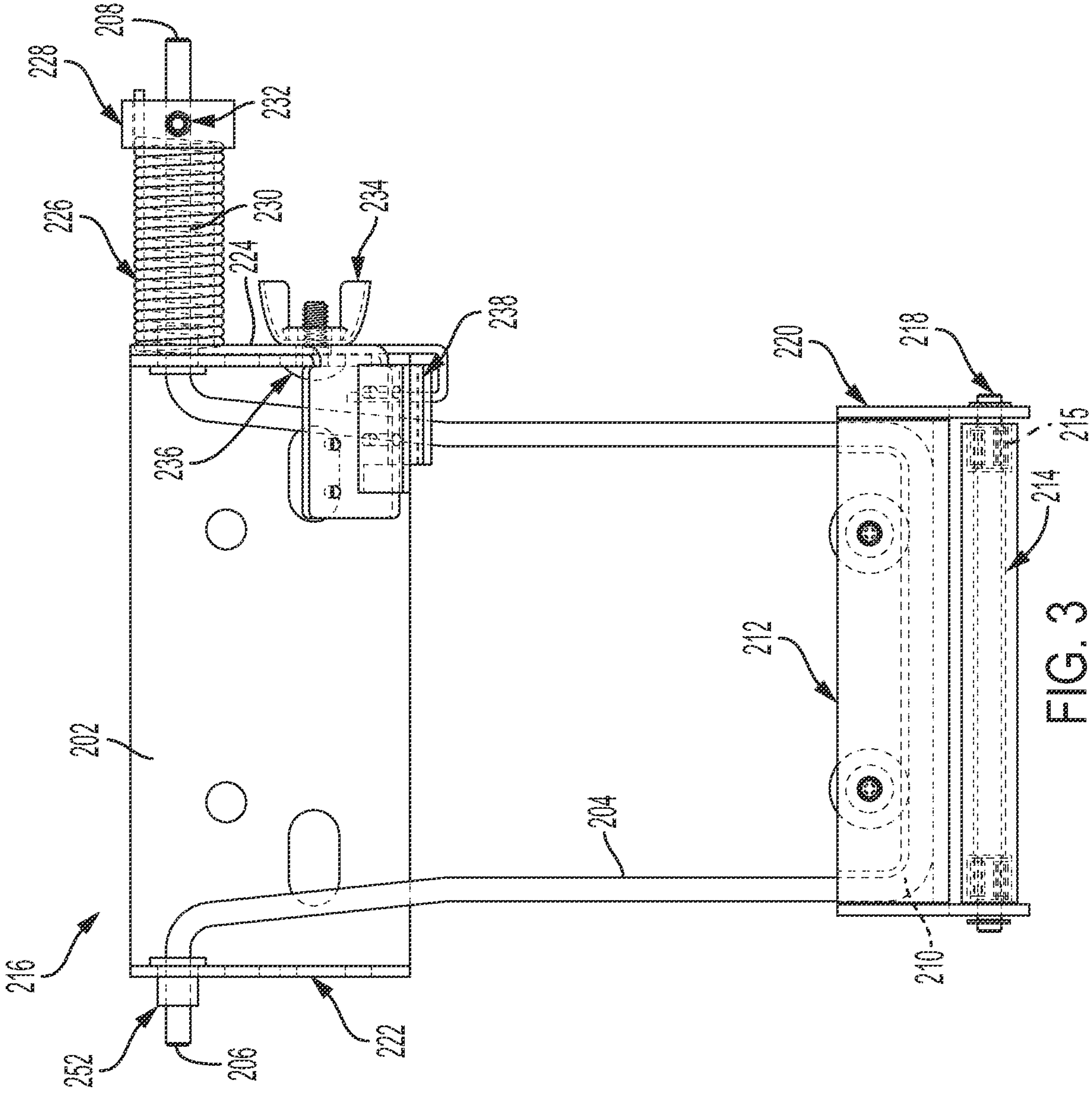
FIG. 3 is a front view of a torsion spring example of the cable tension device of the present disclosure.

FIG. 3 illustrates a front view of an example torsion spring cable tension device 216. The torsion spring cable tension device 216 may be deployed as the cable tension devices $\mathbf{116}_1$ and $\mathbf{116}_2$ illustrated in FIGS. 1 and 2. In one embodiment, the torsion spring cable tension device 216 may be deployed as illustrated in FIG. 3 or may be deployed with an end bearing plate 826, illustrated in FIG. 8, and discussed in further details below.

FIG. 3 illustrates an example of the torsion spring cable tension device 216 that can be mounted on a right hand side of the door 102. However, it should be noted that a mirror image of the torsion spring cable tension device 216 may also be arranged to be mounted on the left hand side of the door 102.

In one embodiment, the torsion spring cable tension device 216 may include a bracket 202. The bracket 202 may provide a base to mount the torsion spring cable tension device 216 to a wall, a doorjamb, the tracks $\mathbf{114}_1$ and $\mathbf{114}_2$, and the like. The bracket 202 may be fabricated from metal or steel. The bracket 202 may have a rectangular shape with openings to receive a mechanical fastener for mounting. The openings may be symmetrically arranged in the bracket 202 such that the bracket can be mounted on either side of the door 102.

In one embodiment, the bracket 202 may include a first side bracket 222 and a second side bracket 224. The first side bracket 222 and the second side bracket 224 may be integrally formed with the bracket 202 from a single piece of metal or steel. The first side bracket 222 and the second side bracket 224 may be located on opposite sides of the bracket 202 and arranged perpendicular to the bracket 202.

Figure 4:
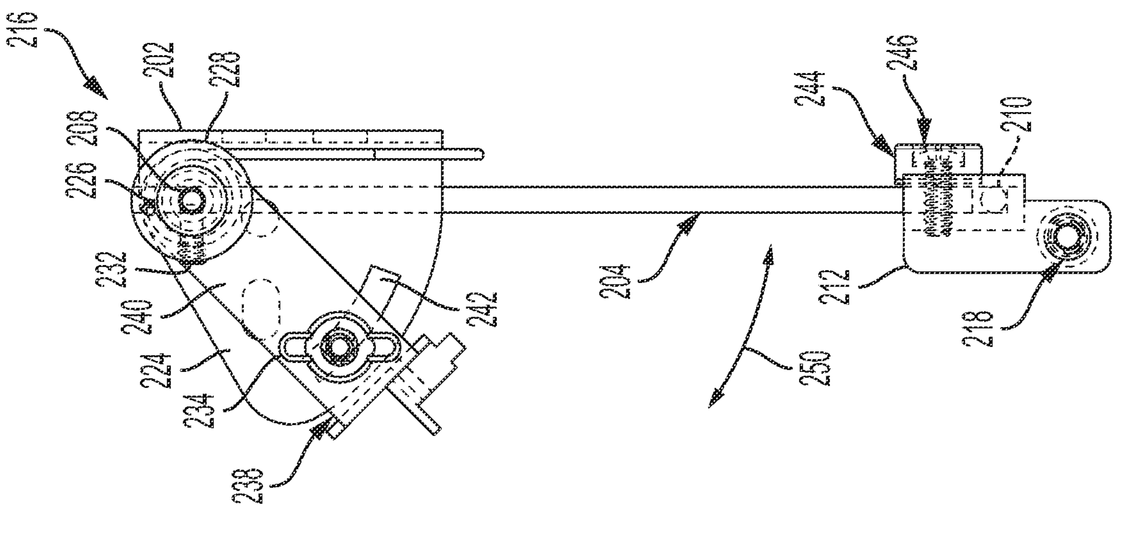
FIG. 4 is a side view of the torsion spring example of the cable tension device of the present disclosure.

The first side bracket 222 and the second side bracket 224 may have various openings and slots (e.g., a slot 242 illustrated in FIG. 4). The position of the openings and slots in the first side bracket 222 and the second side bracket 224 may be the same to allow a torsion spring 226 to be located on either side of the bracket 202. As a result, the torsion spring cable tension device 216 can be mounted on either side of the door 102, as noted above.

In one embodiment, an arm 204 may be rotatably coupled to the bracket 202 via the first side bracket 222 and the second side bracket 224. The arm 204 may have a U-shape. A first end 206 of the arm 204 may be inserted through an opening in the first side bracket 222 and coupled via a bearing flange 252. A second end 208 of the arm 204 may be inserted through an opening in the second side bracket 224. The second end may have a portion 230 that provides enough length to receive the torsion spring 226.

For example, the portion 230 of the second end 208 of the arm 204 may be located between the second side bracket 224 and a collar 228. A set screw 232 may secure the collar 228 against the portion 230 of the second end 208 of the arm 204. The portion 230 of the second end 208 of the arm 204 may be placed through a center or central axis of the torsion spring 226.

The torsion spring 226 may comprise a piece of metal that is wound helically around a central axis or around the portion 230 of the second end 208 of the arm 204. The torsion spring 226 may exert a rotational force against the second end 208 of the arm 204 to cause the arm 204 to move away from the door 102 (e.g., out of the page). The torsion spring 226 may apply a force that causes the arm 204 to be biased in a position that is 90 degrees relative to the bracket 202 or perpendicular to the bracket 202.

The cable 112 may rest against the arm 204 to push the arm 204 back towards the bracket 202. Thus, the cable 112 may apply a force to the arm 204 that opposes the rotational force of the torsion spring 226 to maintain the tension in the cable 112. Over time, as tension is gradually lost in the cable 112, the force applied by the torsion spring 226 may cause the arm 204 to move towards its desired position at 90 degrees relative to the bracket 202 and away from the bracket 202. In other words, the angle 250 may gradually become larger as the tension in the cable 112 is gradually lost over time. The movement of the arm 204 may help keep the cable 112 taut to maintain a desired amount of tension in the cable 112.

In one embodiment, the amount of force applied by the torsion spring 226 may be adjusted by winding or unwinding the torsion spring 226 until a desired amount of rotational force is applied by the torsion spring 226. In one embodiment, the collar 228 may include an opening (not shown) to receive one end of the torsion spring 226 and a set screw 232 to lock the collar 228 in place on the second end 208 of the arm 204. In one embodiment, an Allen wrench may be used to turn the set screw 232 to wind (e.g., compress or increase tension) or unwind (e.g., decompress or decrease tension) the torsion spring 226. Thus, when the torsion spring cable tension device 216 is mounted on both sides of the door 102, the torsion spring 226 may be set for both torsion spring cable tension devices 216 to maintain an equal amount of tension on the first cable $\mathbf{112}_1$ and the second cable $\mathbf{112}_2$.

In one embodiment, the arm 204 may include a horizontal member 210. A roller bar bracket 212 may be coupled to the horizontal member 210 of the arm 204. The roller bar bracket 212 may have opposing sides 220 that hold the roller bar 214. For example, the roller bar 214 may be a hollow tube, or a tube with needle bearings 215 or bearing like material, that is placed over a shaft 218 to allow the roller bar 214 to freely rotate around the shaft 218. The roller bar 214 may receive or contact the cable 112 and roll as the cable 112 is moved vertically up or down as the door 102 is opened or closed. The roller bar 214 may be a metallic tube or may have a rubber surface to prevent the cable 112 from slipping against the roller bar 214 during movement and may be sufficient to resist abrasion of the cable.

FIG. 4 illustrates a side view of the torsion spring cable tension device 216. FIG. 4 illustrates how the arm 204 may rotate and move away from the bracket 202, as shown by arrow 250. As described above, as the cable 112 loses tension, the torsion spring 226 may apply a rotational force on the portion 230 of the second end 208 of the arm 204. The rotational force may cause the arm 204 to rotate away from the bracket 202 and maintain the tensions in the cable 112.

FIG. 4 also illustrates how the roller arm bracket 212 is coupled to the horizontal member 210 of the arm 204. The roller arm bracket 212 may include rubber bumper 244. A fastener 246 (e.g., a screw) may be inserted through openings of the rubber bumper 244 and the roller arm bracket 212 to secure the roller arm bracket 212 against the horizontal member 210 and the rubber bumper 244.

FIG. 4 also illustrates a side view of the second side bracket 224. The second side bracket 224 may include a slot 242. The slot 242 may provide a range of settings for a limit switch 238. In one embodiment, a limit switch bracket 240 may be rotationally coupled to the second side bracket 224. For example, one end of the limit switch bracket 240 may be coupled to the second end 208 of the arm 204, and an opposite end may be coupled to the slot 242.

The slot 242 may be curved to provide a set range of angles by which the limit switch 238 may be triggered. The limit switch 238 may include a sensor that can detect when the arm 204 contacts the limit switch 238. When the arm 204 contacts the limit switch 238, an electrical signal may be generated and transmitted to the motor or operator that controls operation of the door. The electrical signal may cause the motor or operator to stop operation of the door or to return the door to a default safety position.

Contact of the arm 204 to the limit switch 238 may indicate that the amount of tension in the cable 112 that has been lost is greater than an acceptable limit. In other words, the amount of slack in the cable 112 may be greater than the amount of tension that can be maintained by the torsion spring cable tension device 216.

Figure 12:
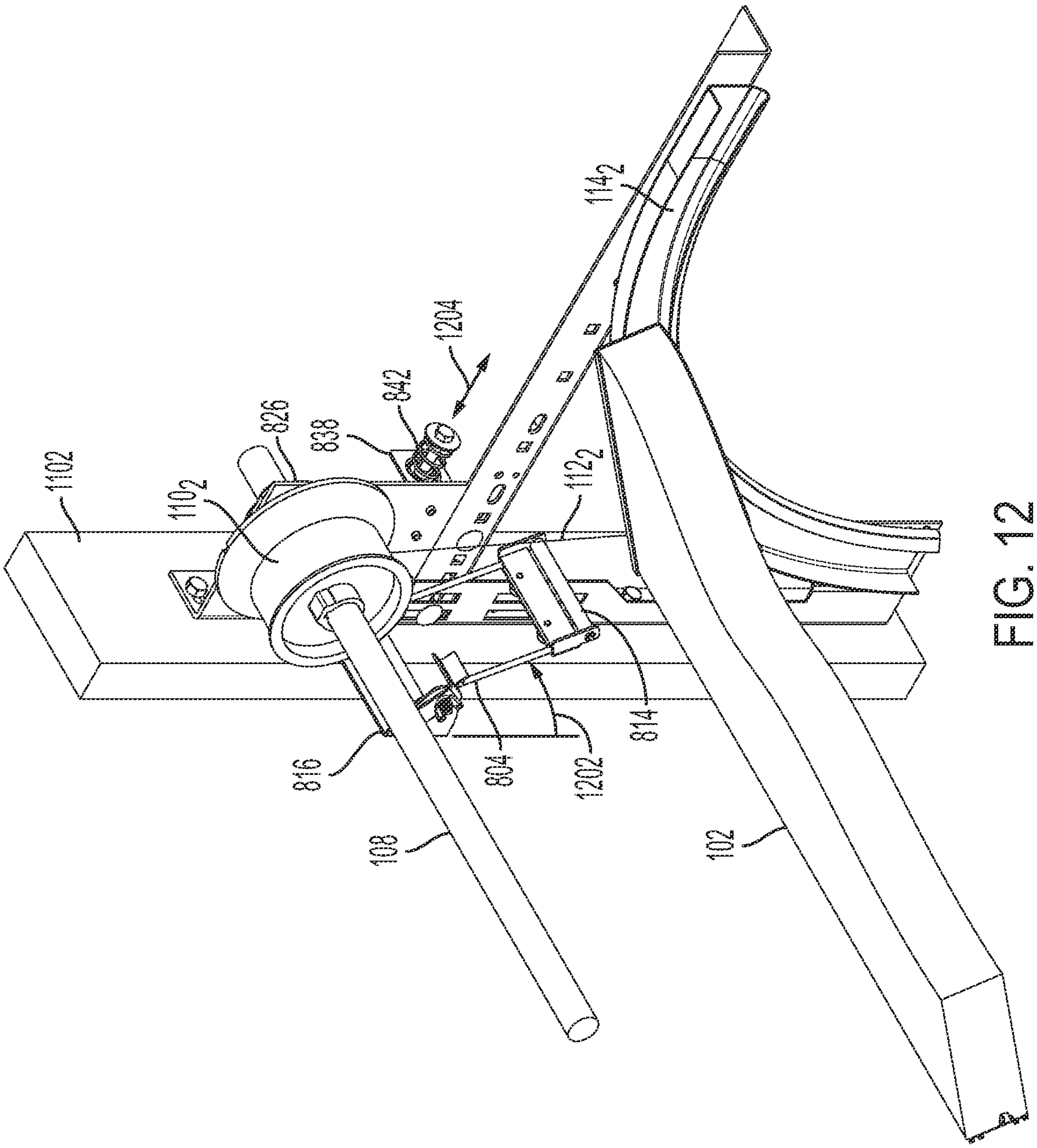
FIG. 12 is an isometric view of the compression spring cable tension device of the present disclosure coupled to the overhead door in a rotated position.
Figure 13:
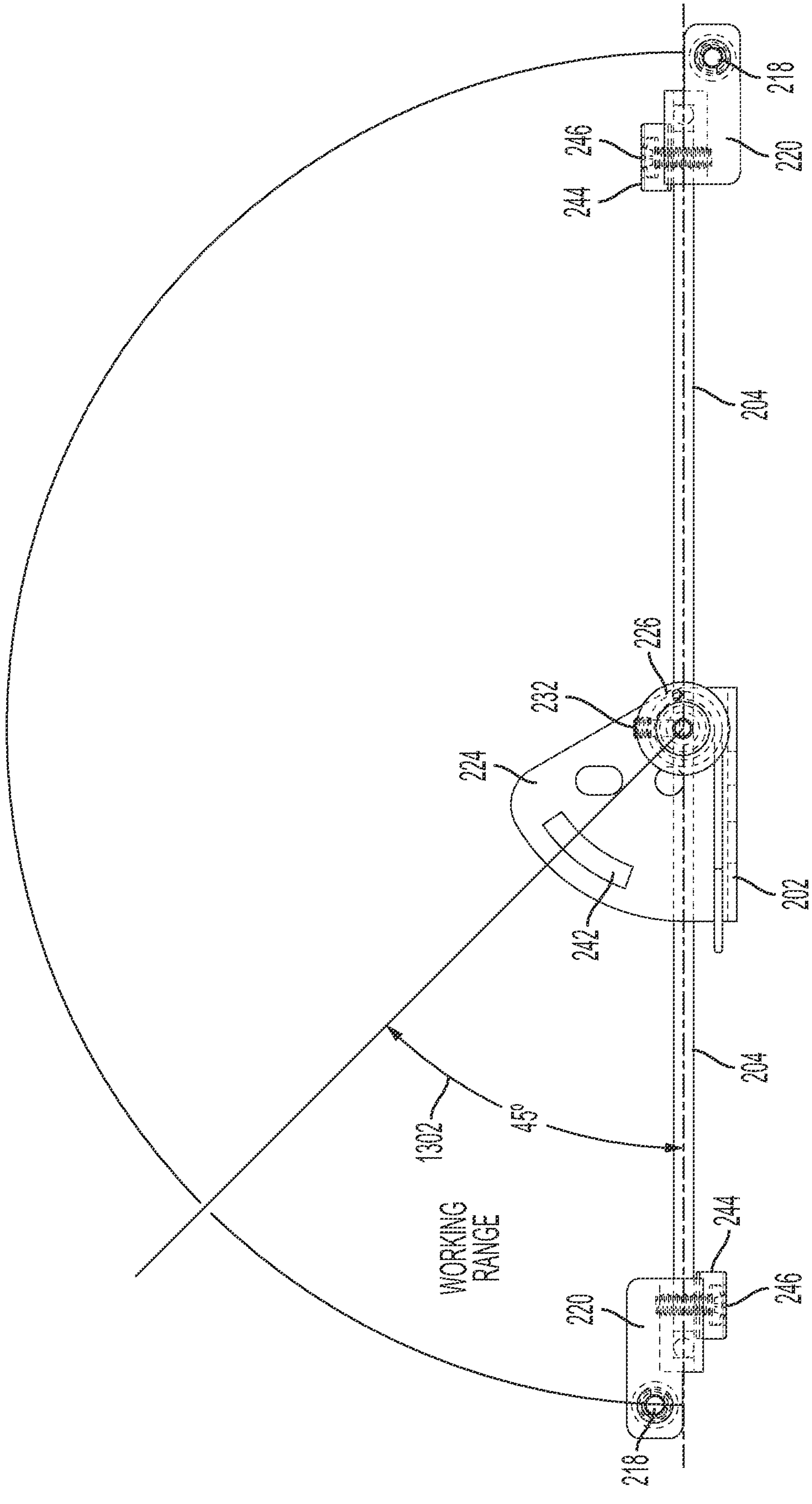
FIG. 13 illustrates an example working range of the cable tension device of the present disclosure.

FIG. 13 illustrates an example view of how the operational range of the cable tension device 116 can be measured. This may apply to the torsion spring cable tension device 216, as well as the compression spring cable tension device 816 illustrated in FIGS. 8-12, and discussed in further details below.

FIG. 13 illustrates how the arm 204 can be moved between 0 degrees (to the left of the page) and 180 degrees (to the right of the page). At a certain angle, the arm 204 may lose the ability to maintain a functional amount of tension in the cable 112. In one example, the slot 242 may allow an angle 1302 to be set between approximately 20 degrees and 60 degrees. In an example, the angle 1302 may be set to approximately 45 degrees, as shown in FIG. 13.

Figure 5:
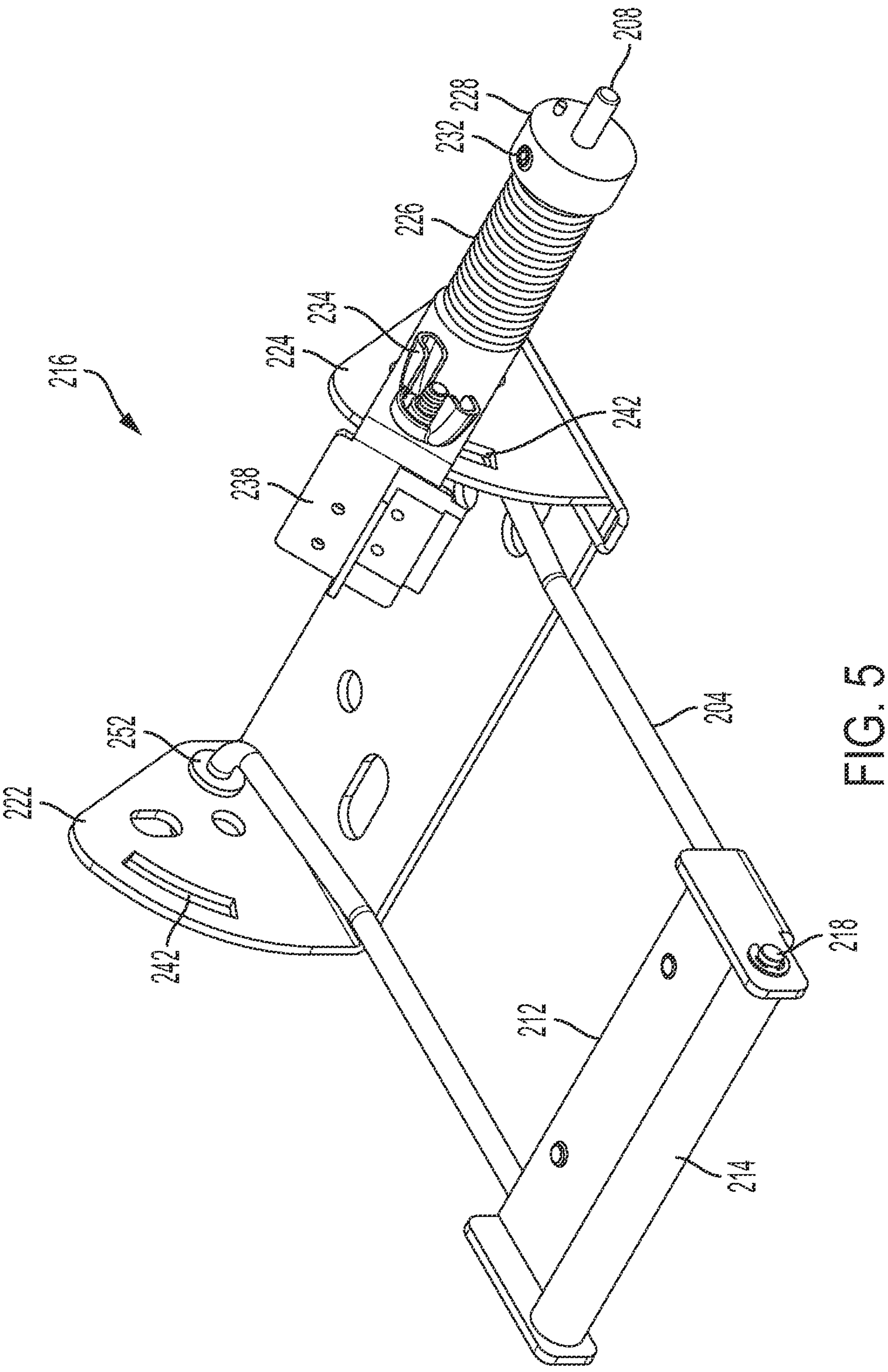
FIG. 5 is an isometric view of the torsion spring example of the cable tension device of the present disclosure.

Referring back to FIG. 5, FIG. 5 illustrates an isometric view of the torsion spring cable tension device 216. FIG. 5 is provided to show an overall view of the torsion spring cable tension device 216. As noted above, the torsion spring cable tension device 216 can be used for right side or left side mounting. The torsion spring 226 may have a left hand and right hand component. However, all other components can be used interchangeably for either right side or left side mounting.

Figure 6:
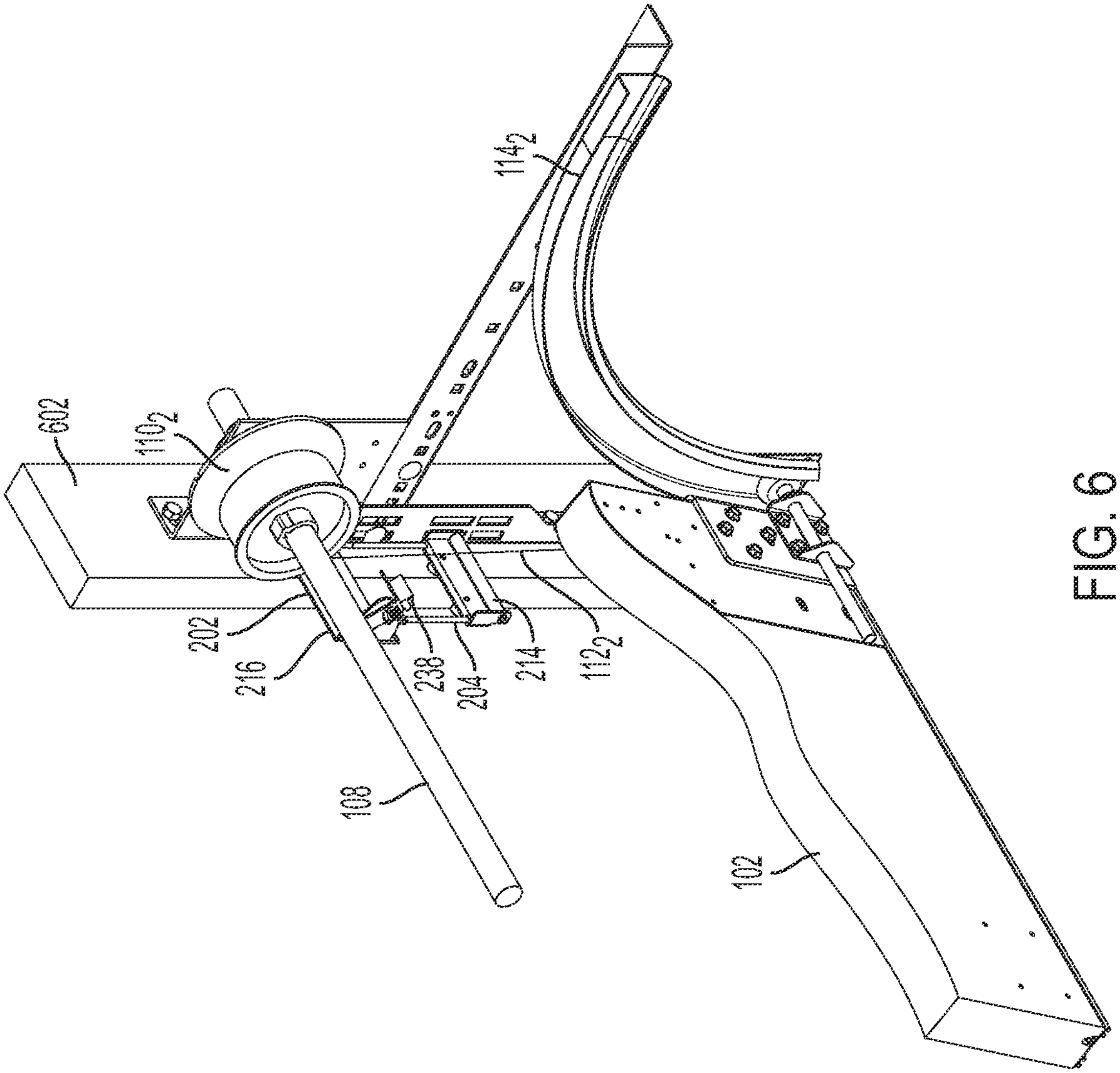
FIG. 6 is an isometric view of the torsion spring cable tension device of the present disclosure coupled to the overhead door in a default position.
Figure 7:
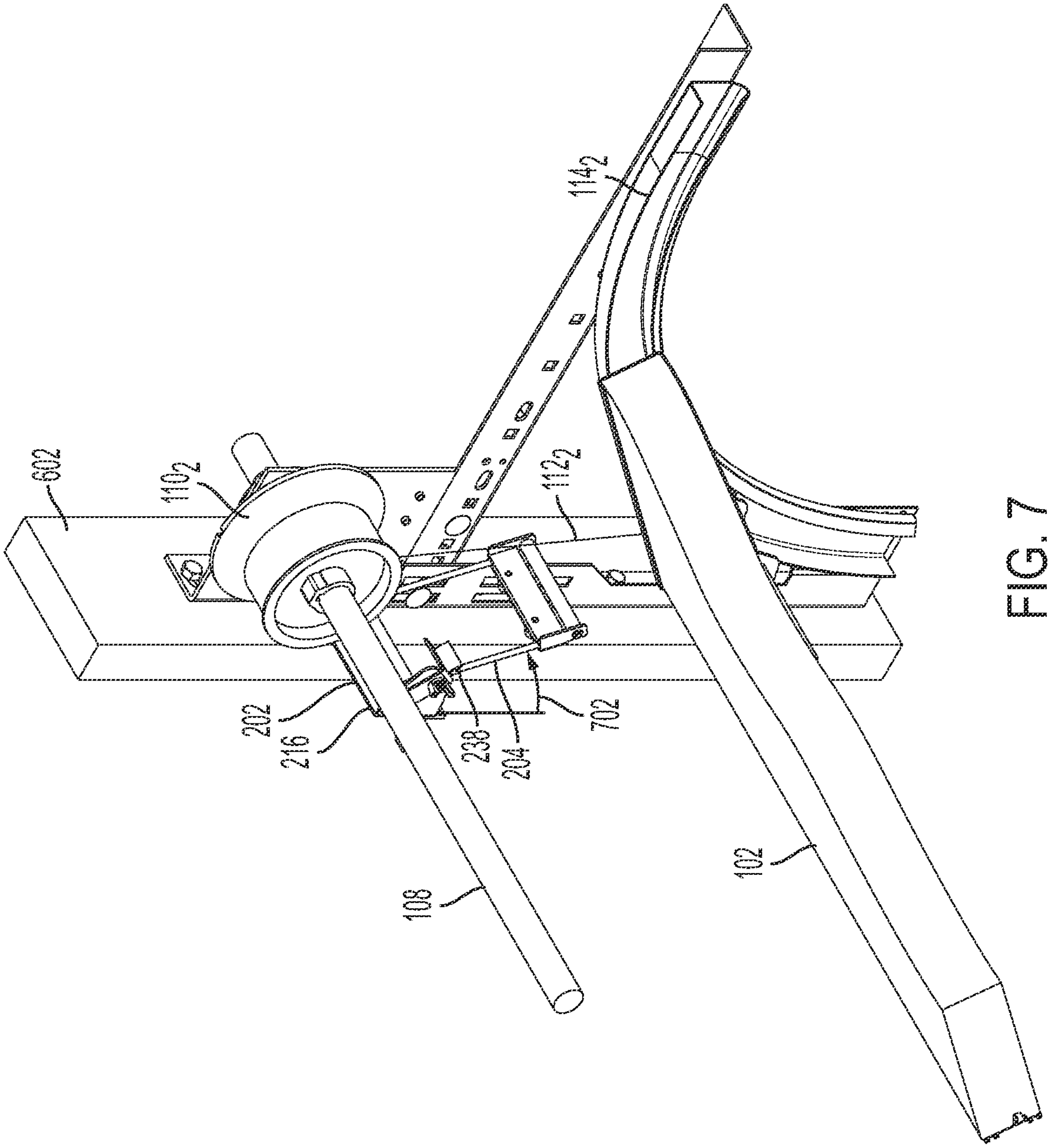
FIG. 7 is an isometric view of the torsion spring cable tension device of the present disclosure coupled to the overhead door in a rotated position.

FIGS. 6 and 7 illustrate the torsion spring cable tension device 216 in operation. FIGS. 6 and 7 illustrate an example of the torsion spring cable tension device 216 mounted onto a wall 602 to a right side of the door 102. However, as noted above, the torsion spring cable tension device 216 may be mounted on the left side of the door 102 and operate in a similar manner, as described below.

FIG. 6 illustrates the torsion spring cable tension device 216 in a starting or initial position, or when the cable $\mathbf{112}_2$ has a maximum amount of tension when the cable $\mathbf{112}_2$ is initially set. The amount of rotational force in the torsion spring 226 may be set to be less than the amount of force applied by the cable $\mathbf{112}_2$ with the maximum amount of tension.

Over time, as the door 102 is opened and closed, the amount of tension in the cable $\mathbf{112}_2$ may be gradually reduced. As a result, the amount of force applied by the torsion spring 226 may overcome the amount of force applied by the tension in the cable $\mathbf{112}_2$. The force applied by the torsion spring 226 may rotate the arm 204, as described above, causing the arm 204 to move towards the door 102 or away from the bracket 202.

FIG. 7 illustrates an example when the tension in the cable $\mathbf{112}_2$ is reduced from a maximum amount of tension. The arm 204 has rotated by an angle 702 away from the wall 602. The cable $\mathbf{112}_2$ may rest against the roller bar 214, and the movement of the arm 204 pulls the cable $\mathbf{112}_2$ taut to maintain a desired amount of tension.

As noted above, when the tension in the cable $\mathbf{112}_2$ is reduced, the arm 204 may engage or contact the limit switch 238. This may indicate that too much tension has been lost in the cable $\mathbf{112}_2$. The limit switch 238 may generate an electrical signal to a motor or operator to stop operation of the door 102. A technician may then replace or adjust the cable $\mathbf{112}_2$ and may reset the tension in the cable $\mathbf{112}_2$ to a desired level. Thus, the arm 204 may move back towards the wall 602 to a starting position, as shown in FIG. 6.

The position of the limit switch 238 may be held in place via the limit switch bracket 240 and a combination of a bolt or screw 236 and a wing nut 234. Although a wing nut 234 is illustrated in FIGS. 3 and 4, it should be noted that any type of nut may be used in combination with the bolt or screw 236. The wing nut 234 allows for easier loosening and tightening by hand to set the position of the limit switch 238 along the slot 242.

Figure 10:
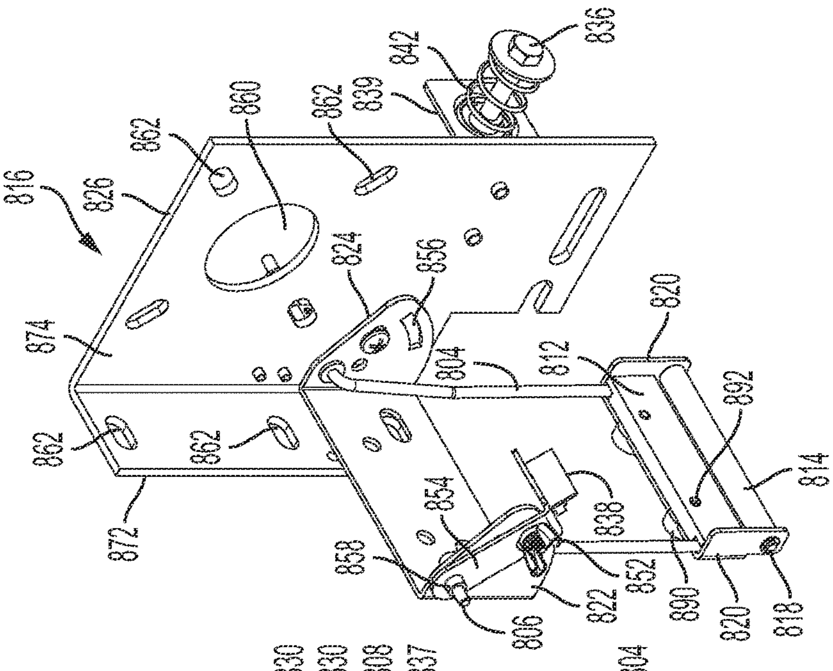
FIG. 10 is an isometric view of the compression spring example of the cable tension device of the present disclosure.
Figure 9:
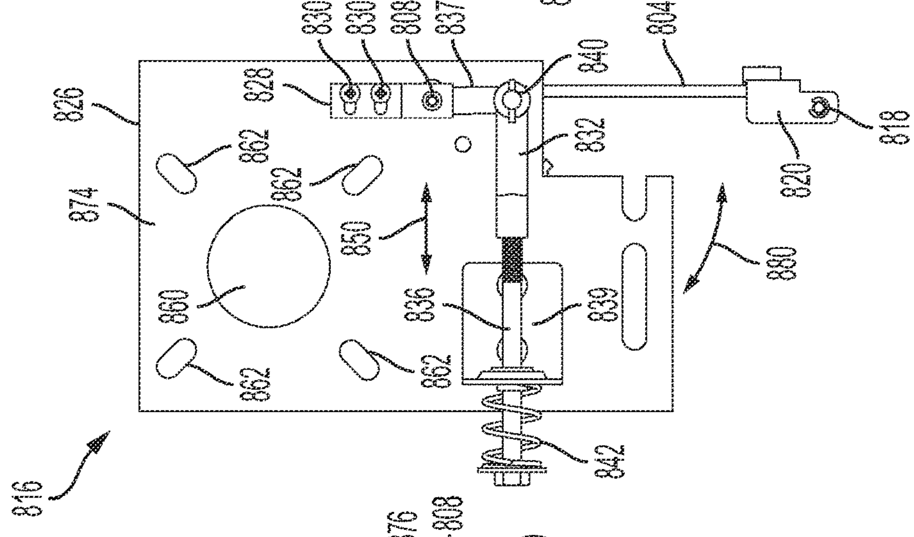
FIG. 9 is a side view of the compression spring example of the cable tension device of the present disclosure.
Figure 8:
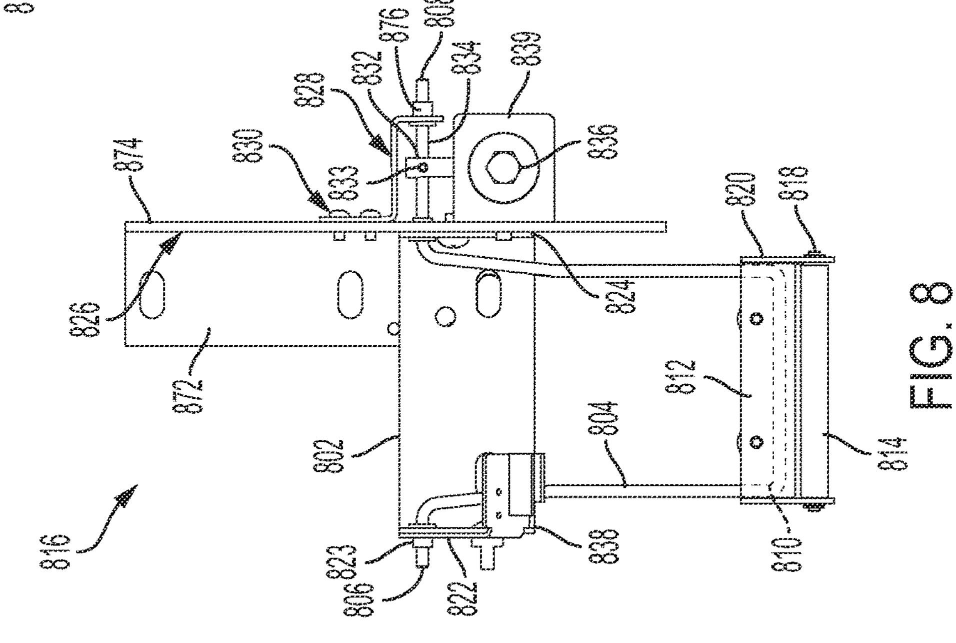
FIG. 8 is a front view of a compression spring example of the cable tension device of the present disclosure.

FIGS. 8-10 illustrate various views of an example compression spring cable tension device 816 of the present disclosure. The compression spring cable tension deice 816 may be deployed as the cable tension devices $\mathbf{116}_1$ and $\mathbf{116}_2$ illustrated in FIGS. 1 and 2.

FIG. 8 illustrates an example of the compression spring cable tension device 816 that can be mounted on a right hand side of the door 102. However, it should be noted that a mirror image of the compression spring cable tension device 816 may also be arranged to be mounted on the left hand side of the door 102.

In one embodiment, the compression spring cable tension device 816 may include a bracket 802. The bracket 802 may provide a base to mount the compression spring cable tension device 816 to a wall, doorjamb, the tracks $\mathbf{114}_1$ and $\mathbf{114}_2$, and the like. The bracket 802 may be fabricated from metal or steel. The bracket 802 may have a rectangular shape with openings to receive a mechanical fastener for mounting. The openings may be symmetrically arranged in the bracket 802 such that the bracket can be mounted on either side of the door 102.

In one embodiment, the bracket 802 may include a first side bracket 822 and a second side bracket 824. The first side bracket 822 and the second side bracket 824 may be integrally formed with the bracket 802 from a single piece of metal or steel. The first side bracket 822 and the second side bracket 824 may be located on opposite sides of the bracket 802 and arranged perpendicular to the bracket 802.

The first side bracket 822 and the second side bracket 824 may have various openings and slots (e.g., a slot 856 illustrated in FIG. 10). The position of the openings and slots in the first side bracket 822 and the second side bracket 824 may be the same to allow a compression spring 842, illustrated in FIGS. 9 and 10, to be located on either side of the bracket 802. As a result, the compression spring cable tension device 816 can be mounted on either side of the door 102, as noted above.

In one embodiment, an arm 804 may be rotatably coupled to the bracket 802 via the first side bracket 822 and the second side bracket 824. The arm 804 may have a U-shape. A first end 806 of the arm 804 may be inserted through an opening in the first side bracket 822 and coupled via a first bearing flange 823. A second end 808 of the arm 804 may be inserted through an opening in the second side bracket 824. The second end 808 may have a portion 834 that provides enough length to be coupled to a reciprocating arm 832 that is coupled to the compression spring 842.

In one embodiment, the compression spring cable tension device 816 may also include an end bearing plate 826. The end bearing plate 826 may have an "L" shape. A first surface 872 and a second surface 874 of the end bearing plate 826 may be positioned at an approximate 90 degree angle to form the "L" shape. The first surface 872 may be coupled to the bracket 802, and the second surface 874 may be coupled to the second side bracket 824.

The portion 834 of the second end 808 of the arm 804 may be located between the second surface 874 of the end bearing plate 826 and an arm bracket 828. A second bearing flange 876 may secure the second end 808 of the arm 804 against a first end of the arm bracket 828. A second end of the arm bracket 828 may be secured against the end bearing plate 826 via mechanical fasteners 830 (e.g., screws or bolts).

FIG. 9 illustrates how the compression spring 842 is coupled to the portion 834 of the second end 808 of the arm 804. A bolt or compression spring bar 836 may be fed through a compression spring bracket 839. The compression spring bracket 839 may be secured against the second surface 874 of the end bearing plate 826. The compression spring 842 may be positioned between an end of the bolt 836 and a surface of the compression spring bracket 839.

The bolt 836 may be fed into the reciprocating arm 832. The reciprocating arm 832 may include a yoke 837 and a rotating joint or rotatable coupling 840 that allows the bolt 836 to move linearly left and right along the page, as shown by an arrow 850. The yoke 837 may be held against the portion 834 of the second end 808 of the arm 804 via a set screw 833. The rotating joint 840 may be formed via a rotatable coupling between the yoke 837 and a portion of the reciprocating arm 832 that is coupled to the bolt 836.

In one embodiment, the compression spring 842 may be under a load that is biased to naturally expand linearly. As a result, the linear expansion of the compression spring 842 may cause the bolt 836 to be pulled to the left, or away from the bracket 802. The linear movement of the bolt 836 may cause the yoke 837 to rotate. Rotation of the yoke 837 may cause the second end 808 of the arm 804 to rotate in a clockwise direction that follows the movement of the yoke 837. The rotation of the second end 808 of the arm 804 may cause the arm 804 to also rotate away from the bracket 802. Thus, the linear movement of the compression spring 842 is translated into a rotational motion in the arm 804.

In one embodiment, the amount of force load applied to the compression spring 842 may be set by tightening or loosening the bolt 836 into a threaded opening of the reciprocating arm 832. For example, tightening the bolt 836 clockwise (CVV) may increase the amount of force load or compression of the compression spring 842, and loosening the bolt 836 counterclockwise (CCVV) may reduce the amount of force load or compression applied by the compression spring 842. Thus, when the compression spring cable tension device 816 is mounted on both sides of the door 102, the compression spring 842 may be set for both compression spring cable tension devices 816 to maintain an equal amount of tension on the first cable $112_1$ and the second cable $112_2$.

The compression spring 842 may apply a force that causes the arm 804 to be biased in a position that is 90 degrees relative to the bracket 802 or perpendicular to the bracket 802. The cable 112 may rest against the arm 804 to push the arm 804 back towards the bracket 802. Thus, the cable 112 may apply a force to the arm 804 that opposes the rotational force created by the linear movement of the compression spring 842 to maintain the tension in the cable 112. Over time, as tension is gradually reduced in the cable 112, the force applied by the compression spring 842 may cause the arm 804 to move towards its desired position at 90 degrees relative to the bracket 802 and away from the bracket 802. In other words, an angle 880 may gradually become larger as the tension in the cable 112 is gradually reduced from the maximum amount of tension over time. The movement of the arm 804 may help keep the cable 112 taut to maintain a desired amount of tension in the cable 112.

Referring back to FIG. 8, the arm 804 may include a horizontal member 810. A roller bar bracket 812 may be coupled to the horizontal member 810 of the arm 804. The roller bar bracket 812 may have opposing sides 820 that hold the roller bar 814. For example, the roller bar 814 may be a hollow tube that is placed over a shaft 818 to allow the roller bar 814 to freely rotate around the shaft 818. The roller bar 814 may receive or contact the cable 112 and roll as the cable 112 is moved vertically up or down as the door 102 is opened or closed. The roller bar 814 may be a metallic hollow tube or a tube with needle bearings or bearing like material or may have a rubber surface to prevent the cable 112 from slipping against the roller bar 814 during movement and be sufficient to resist abrasion of the cable.

FIG. 9 illustrates a side view of the compression spring cable tension device 816. FIG. 9 illustrates how the arm 804 may rotate and move away from the bracket 802, as shown by the arrow 880. As described above, as the cable 112 loses tension, the compression spring 842 may apply a linear force that is translated by the reciprocating arm 832 into a rotational force on the portion 834 of the second end 808 of the arm 804. The rotational force may cause the arm 804 to rotate away from the bracket 802 and maintain the tensions in the cable 112.

FIG. 9 also illustrates a view of the first surface 874 of the end bearing plate 826. The first surface 874 of the end bearing plate 826 may include an opening 860 to receive the shaft 108. The first surface 874 may also include openings 862 to receive a mechanical fastener to be coupled to cable drum 110.

FIG. 10 illustrates an isometric view of the compression spring cable tension device 816. FIG. 10 is provided to show an overall view of the compression spring cable tension device 816. As noted above, the compression spring cable tension device 816 can be used for right side or left side mounting. For example, the portion 834 of the second end 808 of the arm 804 may have a left hand version and a right hand version. All other components may be used interchangeably for either left side or right side mounting.

FIG. 10 also illustrates how the roller arm bracket 812 is coupled to the horizontal member 810 of the arm 804. The roller arm bracket 812 may include rubber bumper 890. A fastener 892 (e.g., a screw) may be inserted through openings of the rubber bumper 890 and the roller arm bracket 812 to secure the roller arm bracket 812 against the horizontal member 810 and the rubber bumper 890.

FIG. 10 also illustrates a side view of the first side bracket 822 and the second side bracket 824. The first side bracket 822 and the second side bracket 824 may include a slot 856. The slot 856 may provide a range of settings for a limit switch 838. In one embodiment, a limit switch bracket 854 may be rotationally coupled to the first side bracket 822. For example, one end of the limit switch bracket 854 may be coupled to the first end 806 of the arm 804, and an opposite end of the limit switch bracket 854 may be coupled to the slot 856. The position of the limit switch 838 may be set via the limit switch bracket 854 and a wing nut 852 coupled to a screw or bolt that is fed through an opening in the limit switch bracket 854 and the slot 856.

The slot 856 may be curved to provide a set range of angles by which the limit switch 838 may be triggered. The limit switch 838 may include a sensor that can detect when the arm 804 contacts the limit switch 838. When the arm 804 contacts the limit switch 838, an electrical signal may be generated and transmitted to the motor or operator that controls operation of the door. The electrical signal may cause the motor or operator to stop operation of the door or to return the door to a default safety position.

As discussed above, contact of the arm 804 to the limit switch 838 may indicate that the amount of tension in the cable 112 is above an acceptable amount. In other words, the amount of slack in the cable 112 may be greater than the amount of tension that can be maintained by the torsion spring cable tension device 816. FIG. 13 illustrates an example view of how the operational range of the cable tension device 116 can be measured, as described above.

Figure 11:
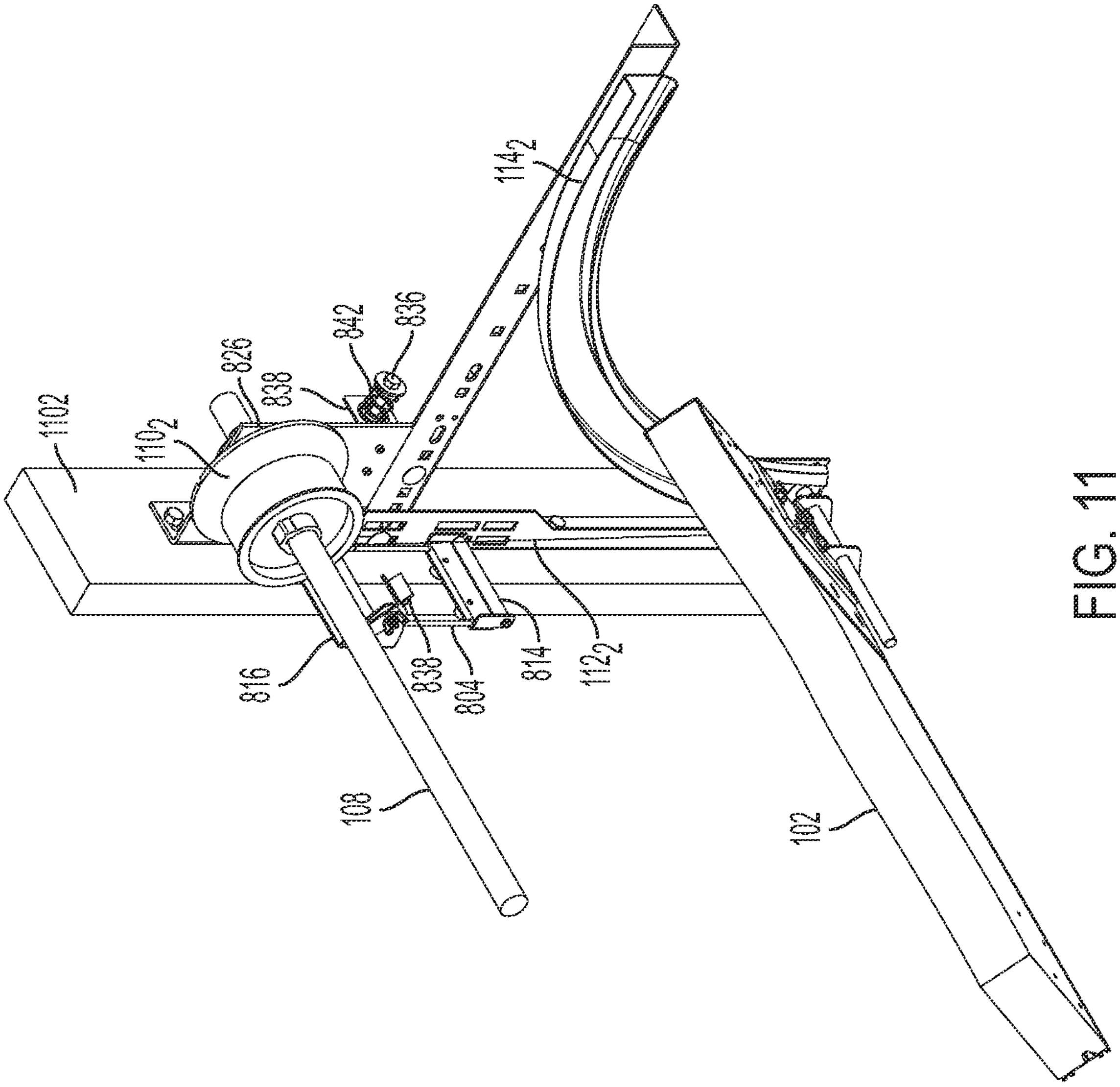
FIG. 11 is an isometric view of the compression spring cable tension device of the present disclosure coupled to the overhead door in a default position.

FIGS. 11 and 12 illustrate the compression spring cable tension device 816 in operation. FIGS. 11 and 12 illustrate an example of the compression spring cable tension device 816 mounted onto a wall 1102 to a right side of the door 102. However, as noted above, the compression spring cable tension device 816 may be mounted on the left side of the door 102 and may operate in a similar manner, as described below.

FIG. 11 illustrates the compression spring cable tension device 816 in a starting or initial position, or when the cable $112_2$ has a maximum amount of tension when the cable $112_2$ is initially set. The amount of force in the compression spring 842 may be set to be less than the amount of force applied by the cable $112_2$ with the maximum amount of tension.

Over time, as the door 102 is opened and closed, the maximum amount of tension in the cable $112_2$ may be gradually reduced. As a result, the amount of force applied by the compression spring 842 may overcome the amount of force applied by the tension in the cable $112_2$. The force applied by the compression spring 842 may rotate the arm 804, as described above, causing the arm 804 to move towards the door 102 or away from the bracket 802.

FIG. 12 illustrates an example at a later time when some of the tension in the cable $112_2$ is reduced from the maximum amount of tension. The force applied by the compression spring 842 may gradually overcome the force applied by the tension in the cable $112_2$. As a result, the compression spring 842 may slowly expand in a linear direction, as shown by an arrow 1204. The linear movement of the compression spring 842 may be translated into a rotational movement of the arm 804. FIG. 12 illustrates how the arm 804 has rotated by an angle 1202 away from the wall 1102. The cable $112_2$ may rest against the roller bar 814, and the movement of the arm 804 pulls the cable $112_2$ taut to maintain a desired amount of tension.

As noted above, when the tension in the cable $112_2$ is reduced, the arm 804 may engage or contact the limit switch 838. This may indicate that too much tension has been lost in the cable $112_2$. The limit switch 838 may generate an electrical signal to a motor or operator to stop operation of the door 102. A technician may then replace, or adjust, the cable $112_2$ and may reset the amount of tension in the cable $112_2$ to an acceptable level. Thus, the arm 804 may move back towards the wall 1102 to a starting position, as shown in FIG. 11.

The position of the limit switch 838 may be held in place via the limit switch bracket 854 and a combination of a bolt or screw and a wing nut 852. Although a wing nut 852 is illustrated in FIG. 10 it should be noted that any type of nut or structure may be used in combination with the bolt or screw. The wing nut 852 allows for easier loosening and tightening by hand to set the position of the limit switch 838 along the slot 856.

Thus, various examples of the cable tension device 116 are illustrated and described above. The cable tension device 116 may use a torsion spring or a compression spring to rotate an arm in contact with the cable to maintain tension in the cable 112.

Moreover, the cable tension device 116 can be mounted to either side of the door 102 and provides a compact design with minimal parts to reduce chances of failure and to maintain a relatively low cost to manufacture. The compact design also allows the cable tension device 116 to be used in a limited volume of space without disrupting other necessary hardware on the overhead door system 100.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. A cable tension device, comprising:

a bracket, the bracket comprising:

a first side bracket coupled to a first end of the bracket, wherein the first side bracket is perpendicular to the bracket; and a second side bracket coupled to a second end of the bracket and opposite the first end of the bracket, wherein the second bracket is perpendicular to the bracket, wherein a slot is formed in the first side bracket or the second side bracket;

a limit switch bracket movably coupled to the first side bracket or the second side bracket;

a U-shaped arm, wherein a first end of the U-shaped arm is rotatably coupled to the first side bracket and a second end of the U-shaped arm is rotatably coupled to the second side bracket;

a roller bar coupled to a horizontal member of the U-shaped arm to receive a cable of an overhead door;

a spring coupled to the first end or to the second end of the U-shaped arm, wherein the spring is under a load to cause the U-shaped arm to rotate away from the bracket to maintain a tension on the cable; and a limit switch, wherein the limit switch is to generate an electrical signal to an operator of the overhead door when the U-shaped arm is rotated past an operational range, wherein the limit switch is coupled to the limit switch bracket, wherein a first end of the limit switch bracket is coupled to the first end or the second end of the U-shaped arm and a second end of the limit switch bracket is coupled to the slot in the first side bracket or the second side bracket, and a position of the limit switch is set within the slot of the first side bracket or the second side bracket via the limit switch bracket to set a range of angles for rotation of the U-shaped arm that are within the operational range, wherein the range of angles comprises between 20 degrees to 60 degrees.

2. The cable tension device of claim 1, wherein the second end of the U-shaped arm is extended through the second side bracket to receive the spring.

3. The cable tension device of claim 1, wherein the spring comprises a torsion spring.

* * * * *